United States Patent
Asfia et al.

(10) Patent No.: US 8,720,530 B2
(45) Date of Patent: May 13, 2014

(54) MULTI-LAYER WICK IN LOOP HEAT PIPE

(75) Inventors: Julie Fatemeh Asfia, Huntington Beach, CA (US); Qingjun Cai, Thousand Oaks, CA (US); Chung-Lung Chen, Thousand Oaks, CA (US)

(73) Assignee: The Boeing Company, Chicago, IL (US)

(*) Notice: Subject to any disclaimer, the term of this patent is extended or adjusted under 35 U.S.C. 154(b) by 1707 days.

(21) Appl. No.: 11/435,964

(22) Filed: May 17, 2006

(65) Prior Publication Data
US 2007/0267180 A1 Nov. 22, 2007

(51) Int. Cl.
*F28D 15/00* (2006.01)
*H05K 7/20* (2006.01)

(52) U.S. Cl.
USPC .................. 165/104.26; 165/104.33; 361/700

(58) Field of Classification Search
USPC .................. 165/104.26, 104.33; 361/700
See application file for complete search history.

(56) References Cited

U.S. PATENT DOCUMENTS

| | | | |
|---|---|---|---|
| 4,765,396 A | 8/1988 | Seidenberg | |
| 4,883,116 A | 11/1989 | Seidenberg et al. | |
| 5,076,352 A * | 12/1991 | Rosenfeld et al. | 165/104.26 |
| 5,732,765 A | 3/1998 | Drolen et al. | |
| 5,735,489 A | 4/1998 | Drolen et al. | |
| 5,787,969 A | 8/1998 | Drolen et al. | |
| 5,839,290 A | 11/1998 | Nazeri | |
| 2005/0230085 A1* | 10/2005 | Valenzuela | 165/104.26 |
| 2005/0252643 A1* | 11/2005 | Kroliczek et al. | 165/104.26 |
| 2006/0162906 A1* | 7/2006 | Hong et al. | 165/104.26 |

OTHER PUBLICATIONS

Kiseev et al., "Analysis of Maximal heat Transfer Capacity of Capillary Loops", Proc. of IX International Heat Pipe Conference, May 1995, Albuquerque, NM vol. 2, pp. 1007-1014.
"Loop heat pipe technology", 2006, Advanced Cooling Technologies, Inc., 1 page, http://www.1-act.com/lhptech.html.

* cited by examiner

*Primary Examiner* — Brandon M Rosati
(74) *Attorney, Agent, or Firm* — Yee & Associates, P.C.

(57) ABSTRACT

In one aspect of the present invention, a multi-layer wick for a loop heat pipe is provided. The multi-layer wick includes a primary wick, the primary wick comprising: a first layer; and a second layer, wherein the first layer surrounds the second layer; and a secondary wick, wherein the second layer of the primary wick surrounds the secondary wick.

In another aspect of the present invention, a method of fabricating a multi-layer wick is provided. The method includes machining the outer diameter of an inner layer larger than the inner diameter of an outer layer; heating the outer layer to enlarge the inner diameter; inserting the inner layer into the outer layer; and cooling the inner layer and the outer layer.

17 Claims, 9 Drawing Sheets

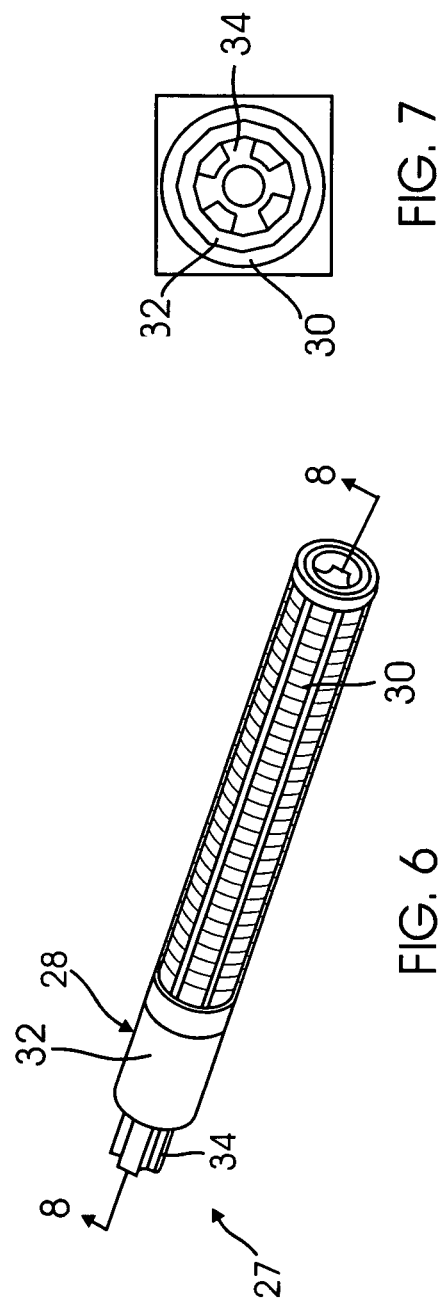
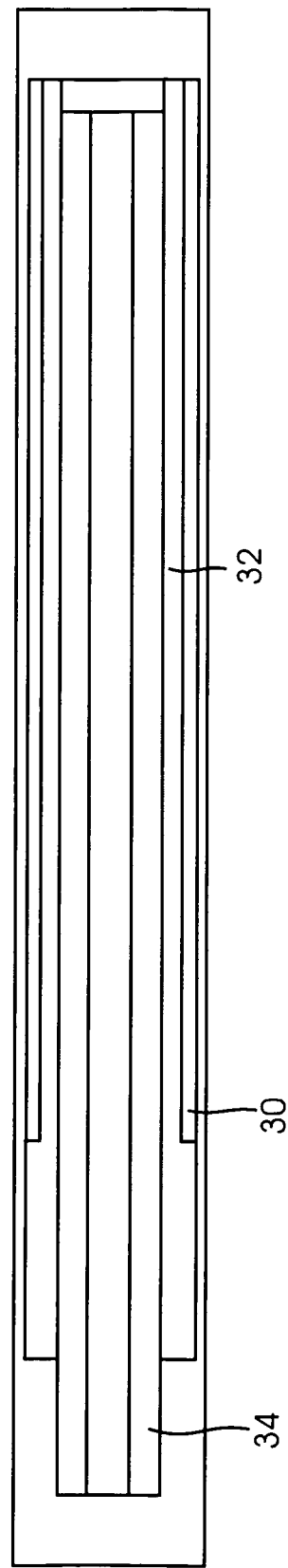
FIG. 6
FIG. 7
FIG. 8

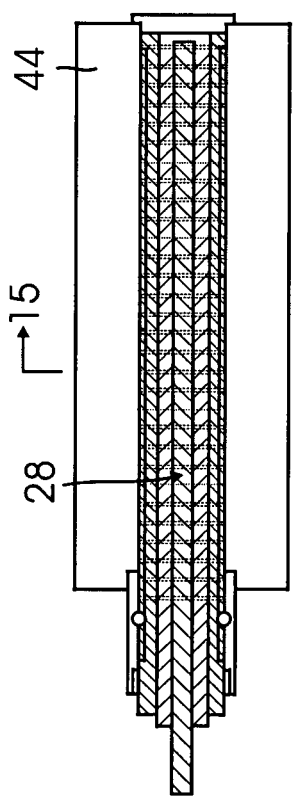
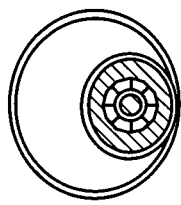
FIG. 14
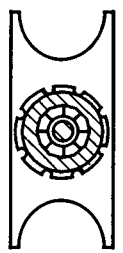
FIG. 15
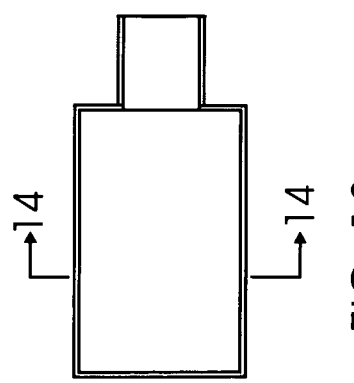
FIG. 13

MULTI-LAYER WICK IN LOOP HEAT PIPE

CROSS REFERENCE TO RELATED APPLICATIONS

None

BACKGROUND

1. Field of Invention

This invention relates generally to heat transfer devices, and more particularly, to a multi-layer wick for a loop heat pipe.

2. Background of the Invention

Loop heat pipes are two-phase heat transfer devices that utilize the evaporation and condensation of a working fluid to transfer heat, and the capillary forces developed in fine porous wicks to circulate the fluid. Loop heat pipes are high efficient heat transfer devices that are used in space applications to transfer heat from one source to another using a fluid in a closed system. Loop heat pipes are different from conventional heat pipes, in that a wick structure is only required in the evaporator section. The wick structure, made of fine porous material, is typically comprised of a primary wick and a secondary wick that provide the driving force for circulating the operating liquid/vapor in the loop heat pipe.

FIG. 1 illustrates a schematic of a conventional loop heat pipe 2 with a wick structure having a primary wick 6 and a secondary wick 20, both made of metal. In loop heat pipe 2, heat is applied to an evaporator 4, in a loop arrangement, causing liquid to evaporate on a liquid/vapor interface within primary wick 6. Saturated vapor 8 flows through vapor grooves in evaporator 4 and merges into a vapor line 10 and a condenser 12 where heat is removed. In other words, the wick structure is used to drive the operating liquid/vapor in loop heat pipe 2 and provides a phase change interface for heat transfer.

Vapor 8 is collected by a system of grooves, which can be located in the wick structure, and flows down vapor line 10 to condenser 12, where it condenses as heat is removed within the condenser 12. The grooves allow vapor 8 to escape out of evaporator 4 into vapor line 10. A compensation chamber 14, at the end of evaporator 4, is designed to compensate the liquid supply of evaporator 4 and adjust the loop heat pipe operating temperature. The lower saturated pressure in compensation chamber 14 forces the condensed liquid to return to evaporator 4. The liquid/fluid then flows into a central pipe 18 where it feeds primary wick 6 and secondary wick 20. Excess fluid drains into compensation chamber 14.

The liquid in compensation chamber 14 and secondary wick 20 must be returned to primary wick 6 to close the cycle. Capillary forces accomplish this passively, sucking liquid back to the surface, just as water will be sucked up into a sponge.

FIG. 2 illustrates a graph of an occurrence of the heat leakage in loop heat pipe 2 of FIG. 1, verified by temperature measurements at various positions in loop heat pipe 2. Table 1 below identifies the positions in loop heat pipe 2 where the temperature was measured. As can be seen in FIG. 2, the greater the change in temperature (ΔT), the more heat leakage that results. For example, the change in temperature between the compensation chamber temperature (TC8) and the vapor line temperature (TC5) indicates a large heat leakage is occurring. This heat leakage is a result of the high thermal conductivity of primary wick 6 which is made of metal.

TABLE 1

| | Thermocouple | | | | |
|---|---|---|---|---|---|
| | TC-1 | TC-5 | TC-7 | TC-8 | TC-9 |
| Position | Vapor in condenser 12 | Vapor out (evaporator) 8 | Evaporator 4 | Compensation Chamber 14 | Liquid line 16 |

To reduce heat leakage, prior systems have substituted ceramic for the metal of primary wick 6. FIG. 3 illustrates an example of a wick structure where primary wick 6 is made of ceramic. Although using ceramic for primary wick 6 reduces heat leakage from evaporator 4 to compensation chamber 14, it also has the negative side effect of causing heat transfer resistance on the heating surface.

In FIGS. 4a-b, portions of loop heat pipes with the primary wick made of ceramic are illustrated. Each portion utilizes vapor grooves in different locations of the loop heat pipes to allow vapor to escape out of evaporator 22 into a vapor line (not shown). As can be seen in FIG. 4a, there is a large temperature difference (ΔT) between evaporator 22 and the vapor line, where groove 24 is located in evaporator 22. This large temperature difference indicates a large thermal resistance from the heating surface to the liquid/vapor interface due to the poor thermal conductivity of ceramic material. Similarly, with FIG. 4b, where groove 24 is located in wick structure 26, a large temperature difference (ΔT) resulting in a large heat leakage is caused by poor thermal conductivity of the ceramic material and the heat transfer across the dry-zone of ceramic wick.

FIG. 5 is a graph illustrating heat leakage of a loop heat pipe utilizing wick structure 26 of FIGS. 4a-b. Using a wick structure where the primary wick is made of ceramic decreases heat leakage, however, since the ceramic wick structure has a low thermal conductivity, there is a large temperature difference (ΔT) between evaporator 22 and vapor line 10.

In view of the above, what is needed is a multi-layer wick for a loop heat pipe that reduces heat leakage from the evaporator to the compensation chamber in a loop heat pipe, increases heat transfer and reduces heat transfer resistance within the ceramic wick.

SUMMARY OF THE INVENTION

In one aspect of the present invention, a multi-layer wick for a loop heat pipe is provided. The multi-layer wick includes a primary wick, the primary wick comprising: a first layer; and a second layer, wherein the first layer surrounds the second layer; and a secondary wick, wherein the second layer of the primary wick surrounds the secondary wick.

In another aspect of the present invention, a loop heat pipe is provided. The loop heat pipe includes a compensation chamber; an evaporator; and a multi-layer wick connecting the compensation chamber to the evaporator, the multi-layer wick comprising: a primary wick, the primary wick comprising: a first layer; and a second layer, wherein the first layer surrounds the second layer; and a secondary wick, wherein the second layer of the primary wick surrounds the secondary wick.

In yet another aspect of the present invention, a method for fabricating a multi-layer wick is provided. The method includes machining the outer diameter of an inner layer larger than the inner diameter of an outer layer; heating the outer layer to enlarge the inner diameter; inserting the inner layer into the outer layer; and cooling the inner layer and the outer layer.

In yet another aspect of the present invention, a multi-layer wick for a loop heat pipe is provided. The multi-layer wick includes a primary wick, the primary wick comprising: a first layer; and a second layer, wherein the first layer surrounds the second layer.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

The foregoing features and other features of the present invention will now be described with reference to the drawings of a preferred embodiment. The illustrated embodiment is intended to illustrate, but not to limit the invention. The drawings include the following:

FIG. 6 illustrates a multi-layer wick for a loop heat pipe, according to one aspect of the present invention;

FIG. 7 is an end view of the multi-layer wick of FIG. 6;

FIG. 8 is a cross-sectional view of the multi-layer wick of FIG. 6, taken along lines 8-8;

FIG. 12 is a top view of an evaporator using a multi-layer wick with vapor grooves on the multi-layer wick;

FIG. 13 illustrates a compensation chamber using a multi-layer wick, according to a second aspect of the present invention;

FIG. 14 is a cross-sectional view of the compensation chamber of FIG. 13, taken along lines 14-14;

FIG. 15 is a cross-sectional view of the evaporator of FIG. 12, taken along lines 15-15;

DETAILED DESCRIPTION OF THE PREFERRED EMBODIMENTS

Figure 1:
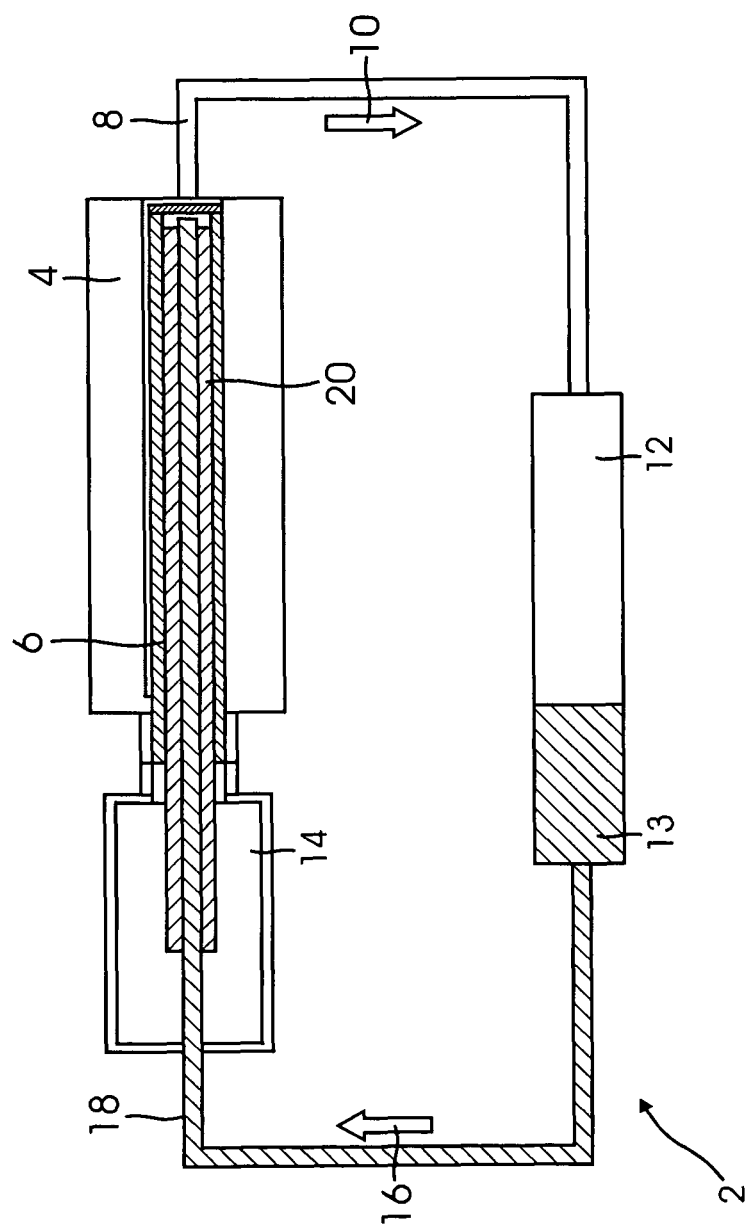
FIG. 1 illustrates a convention loop heat pipe utilizing a conventional wick structure.
Figure 2:
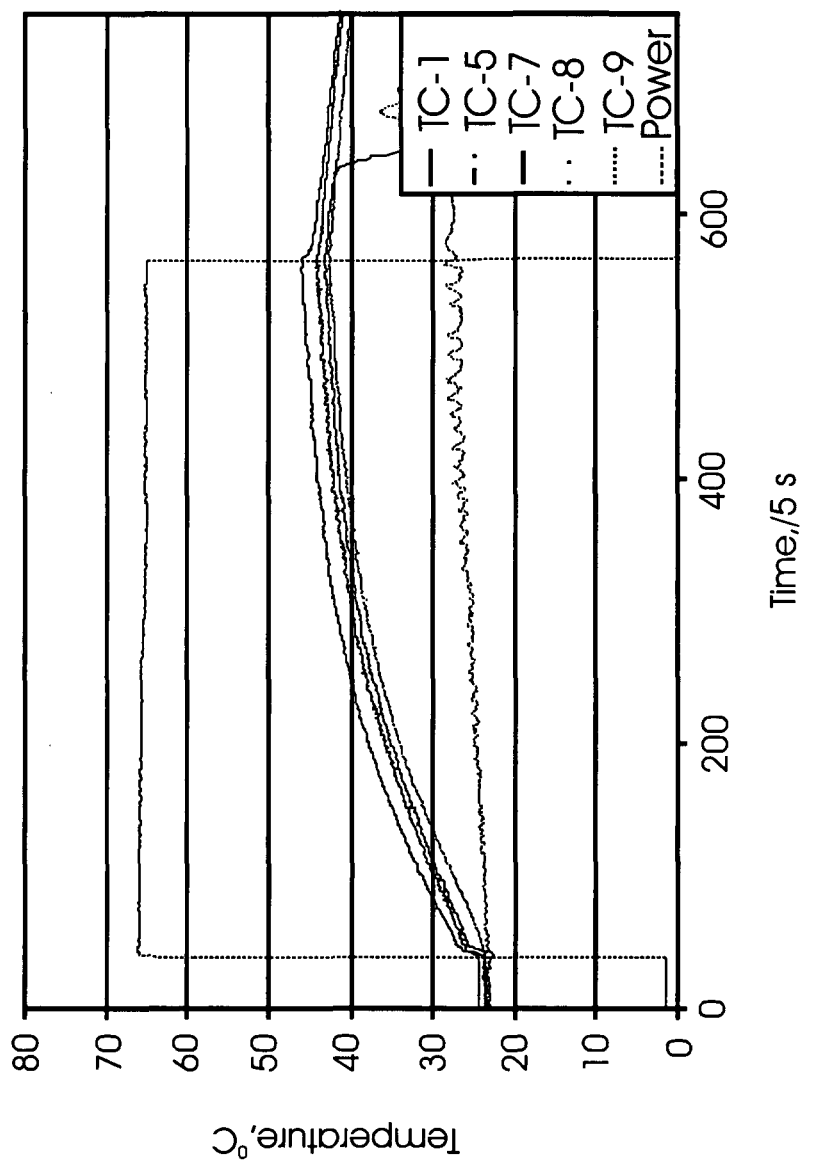
FIG. 2 is a graph illustrating an occurrence of the heat leakage of the loop heat pipe of FIG. 1.
Figure 3:
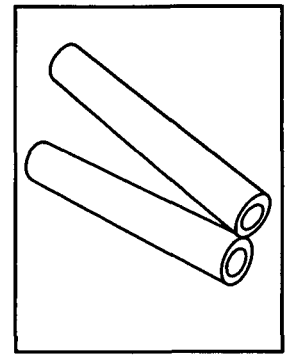
FIG. 3 illustrates a wick structure where the primary wick is made of ceramic, a non-metallic material.
Figure 4A:
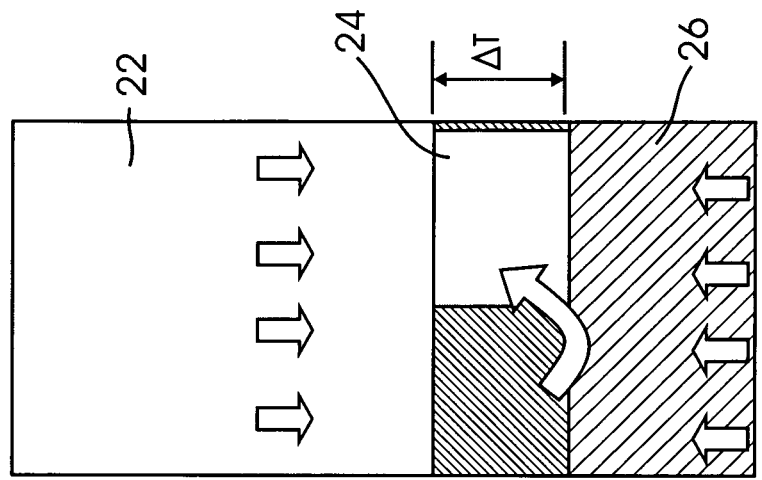
FIGS. 4a-b illustrate an evaporator and compensation chamber utilizing different types of vapor grooves.
Figure 4B:
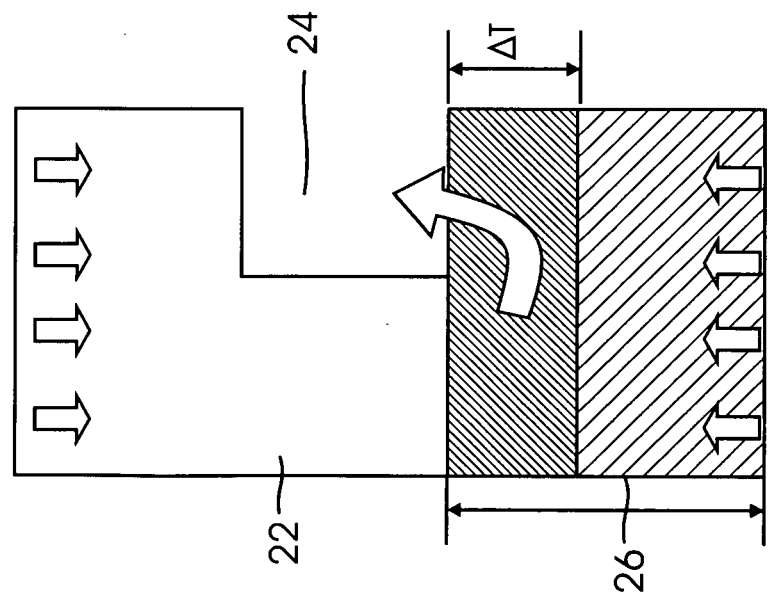
Figure 5:
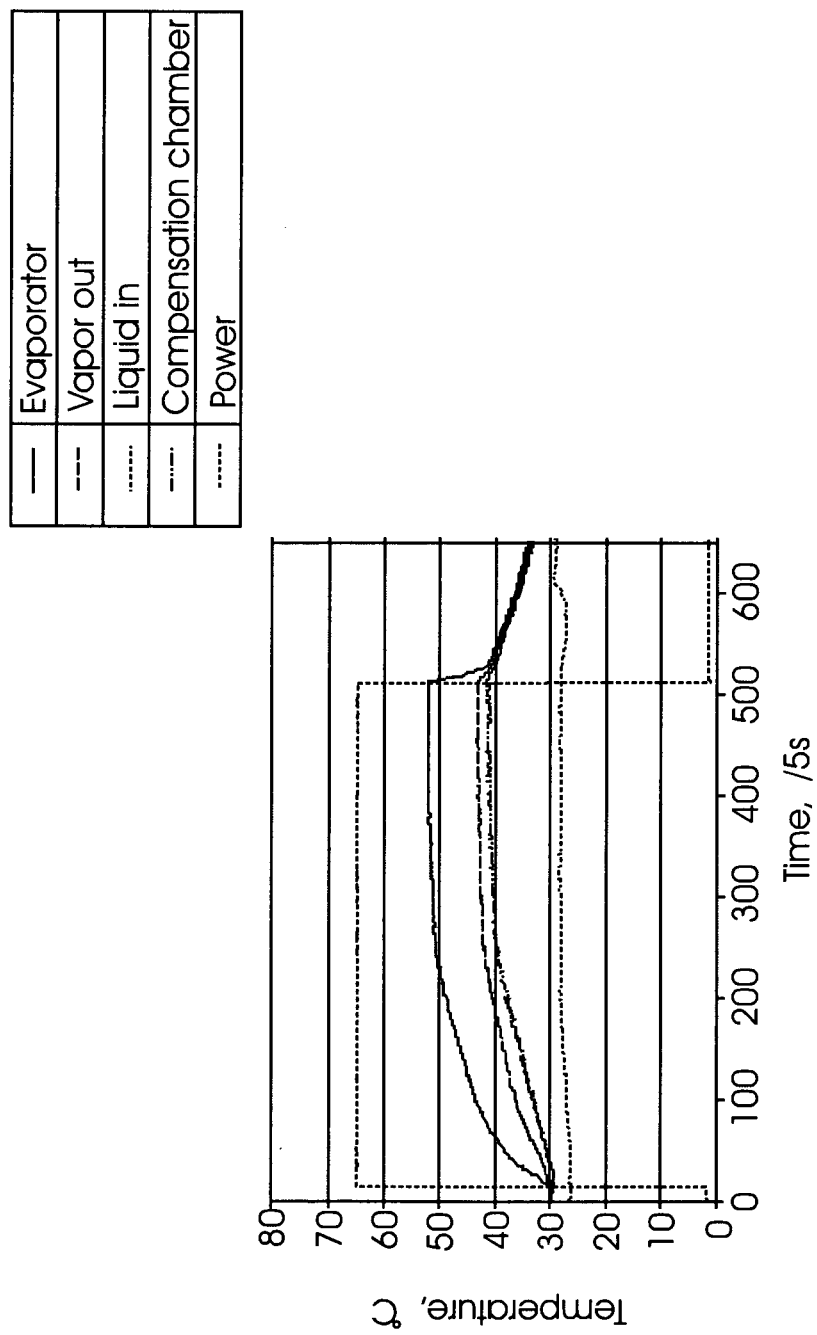
FIG. 5 is a graph illustrating heat leakage of a loop heat pipe utilizing the ceramic primary wick structure of FIGS. 4a-b.

The present invention provides an improved wick structure for a loop heat pipe. The structure and performance of a loop heat pipe is described above with reference to FIG. 1. The wick structure is a multi-layer wick (i.e. has two or more layers with different materials) that prevents heat loss from the heat source to the compensation chamber of the loop heat pipe.

FIG. 6 illustrates a multi-layer wick 27 according to one aspect of the present invention. In the preferred embodiment, multi-layer wick 27 is comprised of a primary wick 28 having a first layer 30 and a second layer 32 surrounding a secondary wick 34. First layer 30 of primary wick 28 is made of a high thermal conductivity material such as nickel. Secondary wick 34 can be made of either low or high thermal conductivity material. Secondary wick 34 is inserted inside second layer 32 of primary wick 28 which is made of low thermal conductivity material such as ceramic and first layer 30 of the primary wick 28 surrounds the second layer of the primary wick 32. The thermal conductivity of the material of first layer 30 of primary wick 28 must be high to reduce transfer resistance from the evaporator to the liquid/vapor interface.

Although the multi-layer wick is described as having a primary wick having a first and second layer, the primary wick can have more than two layers. It should also be noted that the multi-layer wick can be made with or without a secondary wick and the secondary wick can be made of metal or a non-metal porous materials.

In a preferred embodiment, the thickness of first layer 30 of primary wick 28 is between 0.5 mm to 3.0 mm. The pore size of first layer 30 of primary wick 28 is between 0.5 to 10.0 μm, and porosity of second layer 32 of primary wick 28 is between 40% to 75%. The material of first layer 30 of primary wick 28 can be sintered from metal powders, such as porous copper, nickel, aluminum, brass, and silver or from non-metal high thermal conductivity metal such as carbon-carbon.

As a result of multi-layer wick 27, heat leakage from evaporator to compensation chamber is reduced due to thermal insulation (i.e. low thermal conductivity) of the ceramic material of second layer 32 of primary wick 30. In a preferred embodiment, the thickness of second layer 32 of primary wick 28 can vary from 2.0 mm to 10.0 mm. The pore size of second layer 32 can vary from 1.0 to 15.0 μm, and porosity can vary from 40% to 75%. The material of second layer 32 can be porous low thermal conductivity materials such ceramic, silica, composite polymer, and plastic. (The ceramic can be a 0640 porous ceramic cylinder manufactured by Soilmoisture Equipment Corp. of Santa Barbara, Calif.).

The length and diameter of multi-layer wick 27 is determined by the total input heat load. In other works, the length and diameter are determined by the application in which the loop heat pipe is to be used.

Furthermore, heat transfer in multi-layer wicks increases while reducing the temperature difference between compensation chamber and the liquid line (sub-cooling). First layer 30 of primary wick 28 has to have high thermal conductivity (metal) while second layer 32 of primary wick 28 has to have low thermal conductivity (which is non-metal). The metallic and non-metallic material used is determined based on the type of liquid that flows in and the actual dimension and length would depend on the heat loads. Table 2 below illustrates examples of materials for both the primary and secondary wicks that can be used with specific fluids.

TABLE 2

| Working Fluid | Compatible Material |
| --- | --- |
| Water | Stainless Steel, Copper, Silica, Nickel, Titanium |
| Ammonia | Aluminum, Stainless steel, Cold rolled steel, Iron, Nickel |

TABLE 2-continued

| Working Fluid | Compatible Material |
| --- | --- |
| Methanol | Stainless steel, Iron, Copper, Brass, Silica, Nickel |
| Acetone | Aluminum, Stainless steel, Copper, Brass, Silica |
| Freon-11 | Aluminum |
| Freon-21 | Aluminum, Iron |
| Freon-113 | Aluminum |
| Heptane | Aluminum |
| Dowtherm | Stainless steel, Copper, Silica |
| Lithium | Tungsten, Tantalum, Molybdenum, Niobium |
| Sodium | Stainless steel, Nickel, Inconel, Niobium |
| Cesium | Titanium, Niobium |
| Mercury | Stainless steel |
| Lead | Tungsten, Tantalum |
| Silver | Tungsten, Tantalum |

FIG. 7 is an end view of multi-layer wick 28 of FIG. 6. FIG. 8 is a cross-sectional view of the multi-layer wick of FIG. 6, taken along lines 8-8.

Figure 9:
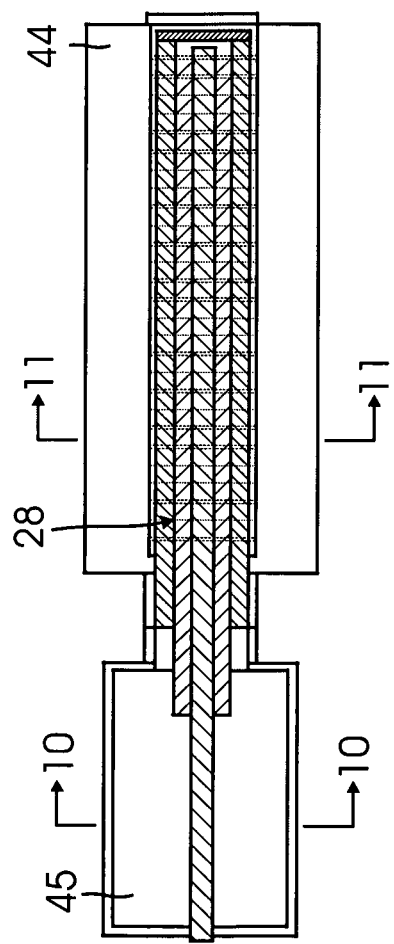
FIG. 9 is a top view of a loop heat pipe evaporator using a multi-layer wick with vapor grooves on the evaporator.
Figure 11:
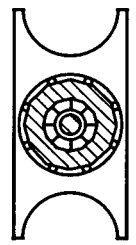
FIG. 11 is a cross-sectional view of the evaporator of the loop heat pipe of FIG. 9, taken along lines 11-11.

FIG. 9 is a top view of a loop heat pipe evaporator using multi-layer wick 27 with vapor grooves on an evaporator 44 (see FIG. 11). A compensation chamber 45, made of stainless steel, and multi-layer wick 27 connects compensation chamber 45 to evaporator 44. A portion of secondary wick 34 is inside compensation chamber 45.

Figure 10:
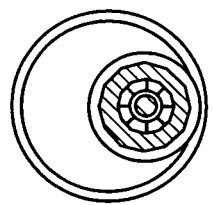
FIG. 10 is a cross-sectional view of the compensation chamber of the loop heat pipe of FIG. 9, taken along lines 10-10.

FIG. 10 is a cross-sectional view of compensation chamber 45 of the loop heat pipe of FIG. 9, taken along lines 10-10. FIG. 11 is a cross-sectional view of evaporator 44 of the loop heat pipe of FIG. 9, taken along lines 11-11.

FIG. 12 is a top view of evaporator 44 using multi-layer wick 27 with vapor grooves located on multi-layer wick 27 (see FIG. 15). FIG. 13 illustrates compensation chamber 45 using multi-layer wick 27 with vapor grooves located on multi-layer wick 27. FIG. 14 is a cross-sectional view of condensation chamber 45 of FIG. 13, taken along lines 14-14. FIG. 15 is a cross-sectional view of evaporator 44 of FIG. 12, taken along lines 15-15.

The grooves allow the vapor to escape out of the evaporator into the vapor line. Vapor channels, longitudinal and circumferential grooves are made on either second layer 32 of primary wick 28 or the inner surface of evaporator 44. The performance of the loop heat pipe is the same, regardless of where the grooves are located.

Figure 16:
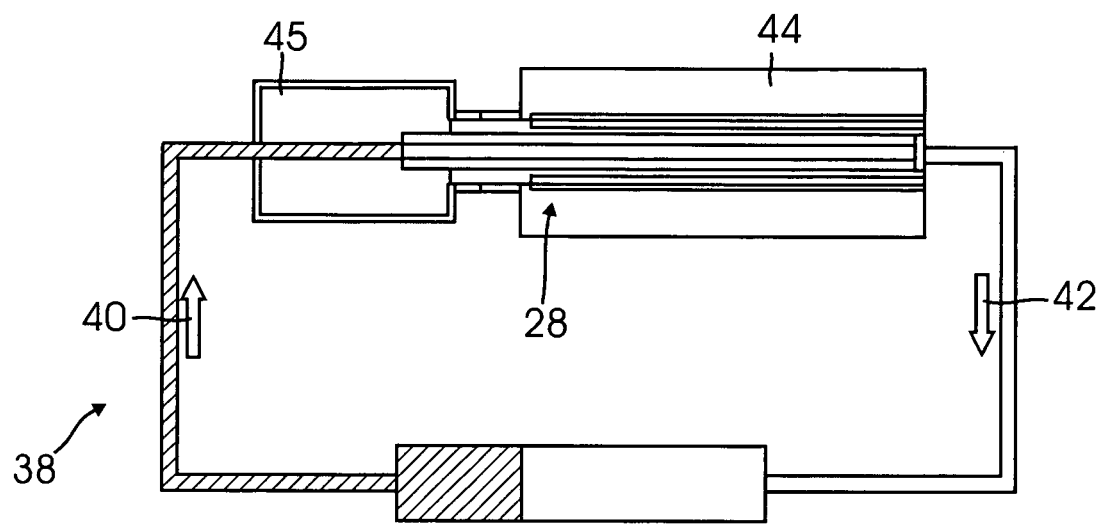
FIG. 16 is a loop heat pipe with liquid and vapor lines separated, according to one aspect of the present invention.

FIG. 16 illustrates a first embodiment of a loop heat pipe 38 utilizing multi-layer wick 27 of the present invention. In the first embodiment, liquid 40 and vapor 42 lines are separated. Vapor line 42 starts from the end of the evaporator 44 so vapor line 42 and liquid line 40 are far apart from each other.

Figure 17:
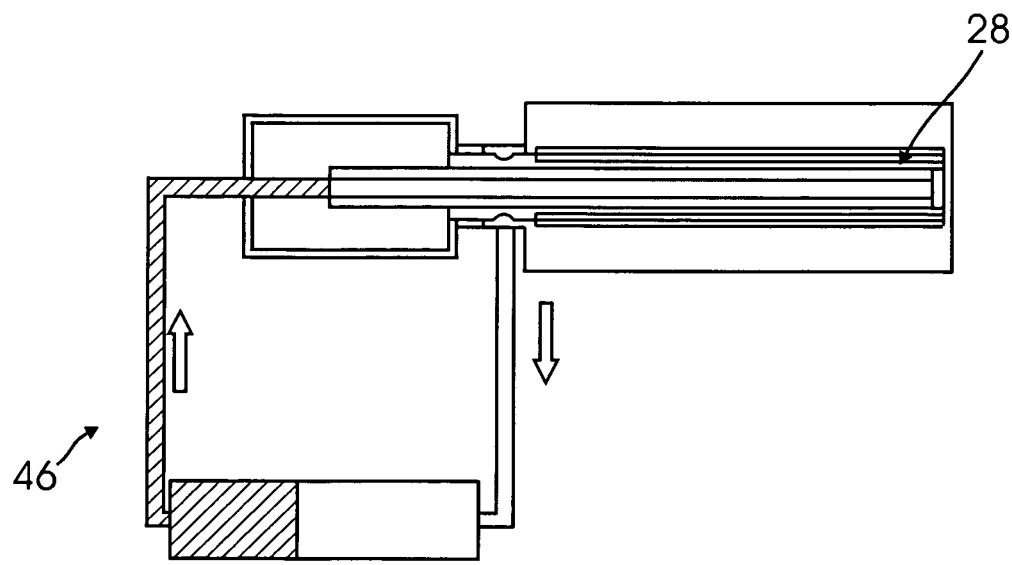
FIG. 17 is a loop heat pipe with liquid and vapor lines close together, according to one aspect of the present invention.

FIG. 17 illustrates a second embodiment of a loop heat pipe 46 utilizing multi-layer wick 27 of the present invention. In the second embodiment, liquid 40 and vapor 42 lines are close together. Vapor line starts from the beginning of the evaporator 44 so vapor line 42 and liquid line 40 are close together.

The performance of the loop heat pipe is the same, regardless of whether the liquid line and vapor line are close together. The designs in FIGS. 16 and 17 are application specific.

Fabrication of multi-layer wick 28 (i.e. the interface between the outer 31 and inner layer 33) is completed by a heat-treat approach. The inner layer 33 is comprised of first layer 30 of primary wick 28 and secondary wick 34 and the outer layer 31 is comprised of second layer 32.

Figure 18:
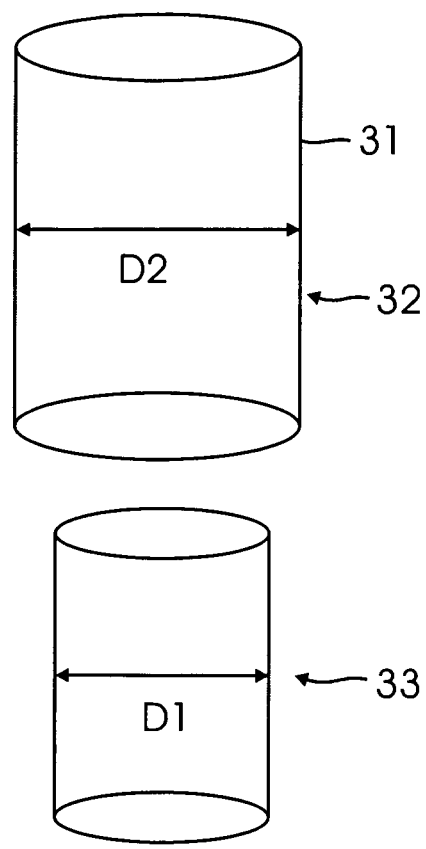
FIG. 18 illustrates the fabrication of the multi-layer wick, according to one aspect of the present invention.

As shown in FIG. 18, the outer diameter D1 of the inner layer 33 is machined slightly larger than the inner diameter D2 of the outer layer 31. By heating the outer layer 31 and enlarging its inner diameter D2, the inner layer 33 is quickly installed. After both layers cool down, a tight connection (interface fit) is built up. The same process is used to install multi-layer primary wick 28 into evaporator 44. The combination of the inner 33 and outer 31 layer materials is selected by their compatibility with the operating liquid.

The length of the outer layer 31 is equivalent to the length of evaporator 44, i.e. goes all the way through. The inner layer length is longer than the outer layer and equivalent to the length from compensation chamber 45 to evaporator 44 (low thermal conductivity layer goes all the way through). To prevent heat leakage to compensation chamber 45 through conduction, the section of multi-layer wick 27 between compensation chamber 45 and evaporator 44 only uses one layer of low thermal conductivity material, which is the same as the inner layer material. The outer diameter of the entire multi-layer wick is uniform, regardless of material variations.

While the present invention is described above with respect to what is currently considered its preferred embodiments, it is to be understood that the invention is not limited to that described above. To the contrary, the invention is intended to cover various modifications and equivalent arrangements within the spirit and scope of the appended claims.

What is claimed is:

1. A multi-layer wick structure for a loop heat pipe, comprising:
    a primary wick including a first layer and a second layer, wherein the first layer made of a first material substantially surrounds a first portion of the second layer, the second layer having a second portion which is not surrounded by the first layer and extends beyond the first layer, the second layer made of a second material having a lower thermal conductivity than the first material; and
    a secondary wick made of a third material having a thermal conductivity higher than the second material disposed at least partially within the primary wick.

2. The multi-layer wick of claim 1, wherein the first material comprises nickel.

3. The multi-layer wick of claim 1, wherein the second material comprises a ceramic.

4. The multi-layer wick of claim 1, wherein the multi-layer wick connects a compensation chamber to an evaporator in the loop heat pipe.

5. The multi-layer wick of claim 4, wherein a portion of the secondary wick is inside the compensation chamber.

6. The multi-layer wick of claim 1, wherein the primary wick further comprises a third layer, and wherein the second layer of the primary wick is surrounding the third layer of the primary wick.

7. A loop heat pipe comprising:
    a compensation chamber;
    an evaporator; and
    a multi-layer wick connecting the compensation chamber to the evaporator, the multi-layer wick comprising:
    a primary wick including a first layer and a second layer, wherein the first layer is made of a first material and surrounds a covered portion of the second layer, the second layer made of a second material having a lower thermal conductivity than the first material, the second layer including an uncovered portion extending a length from the compensation chamber to the covered portion to prevent heat leakage to the compensation chamber; and a secondary wick made of a third material having a thermal conductivity higher than the second material disposed at least partially within the primary wick.

8. The loop heat pipe of claim 6, wherein the first and third material comprise nickel and the second material comprises a ceramic.

9. The loop heat pipe of claim 6, wherein a portion of the secondary wick is inside the compensation chamber.

10. A multi-layer wick structure for a loop heat pipe, comprising:
an elongated primary wick including a first layer made of a first material and a second layer made of a second material, wherein the first layer substantially surrounds at least a portion of the second layer, and wherein the first material has a higher thermal conductivity than the second material.

11. The multi-layer wick structure of claim 10, wherein the second layer includes a first portion surrounded by the first layer and a second portion not surrounded by the first layer.

12. The multi-layer wick structure of claim 11, wherein an outer diameter of the wick structure is uniform along a length of the wick structure including a portion thereof corresponding to the second portion of the second layer and a portion thereof corresponding to the first portion of the second layer surrounded by the first layer.

13. The multi-layer wick structure of claim 10, further comprising a secondary wick extending from the second layer and surrounded at least partially by the second layer.

14. The multi-layer wick structure of claim 13, wherein the secondary wick is made of a third material having a thermal conductivity higher than the second material.

15. The multi-layer wick structure of claim 1, wherein:
a pore size of the first layer of the primary wick is between approximately 0.5 µm and 10.0 µm; and
a pore size of the second layer of the primary wick is between approximately 1.0 µm and 15.0 µm.

16. The loop heat pipe of claim 7, wherein:
a pore size of the first layer of the primary wick is between approximately 0.5 µm and 10.0 µm; and
a pore size of the second layer of the primary wick is between approximately 1.0 µm and 15.0 µm.

17. The multi-layer wick structure of claim 10, wherein:
a pore size of the first layer is between approximately 0.5 µm and 10.0 µm; and
a pore size of the second layer is between approximately 1.0 µm and 15.0 µm.

* * * * *